Patented Oct. 30, 1951

2,572,941

UNITED STATES PATENT OFFICE 2,572,941

PROCESS FOR PRODUCING 2-METHYL-1,3-PENTANEDIOL

Alexander F. MacLean, Robstown, and Adin Lee Stautzenberger, Corpus Christi, Tex., assignors to Celanese Corporation of America, a corporation of Delaware No Drawing. Application July 8, 1948, Serial No. 37,537

2 Claims. (Cl. 260—635)

This invention relates to the production of glycols and relates more particularly to an improved process for the production of 2-methyl-1,3-pentanediol.

An object of this invention is the provision of an efficient and economical process for the production of 2-methyl-1,3-pentanediol by condensing propionaldehyde to propionaldol and concurrently hydrogenating the propionaldol as formed.

Other objects of this invention will appear from the following detailed description.

We have found that 2-methyl-1,3-pentanediol may be obtained conveniently and in excellent yield by condensing propionaldehyde to propionaldol under alkaline conditions in an inert solvent medium and concurrently with the formation of the propionaldol catalytically hydrogenating the same to 2-methyl-1,3-pentanediol. By effecting the condensation at a temperature of 200 to 300° F. under a hydrogen pressure of 200 to 3000 pounds per square inch with a hydrogenation catalyst such as nickel, for example, present in the inert solvent medium, the hydrogenation of the propionaldol is effected as it is formed. Suitable inert solvents are, for example, propyl alcohol, diethyl ether, acetal, etc.

In order to maintain the reaction mixture alkaline during the aldol condensation and concurrent hydrogenation, suitable alkaline agents such as sodium hydroxide, sodium carbonate, ethanolamine, calcium oxide or magnesium oxide in the necessary amounts may be added to the reaction mixture. Preferably, the degree of alkalinity during the aldol condensation and hydrogenation reaction should be such that if a portion of the non-aqueous alkaline reaction mixture is diluted with an equal volume of water, the pH of the diluted solution will be at least 7.5. Dilution with water is necessary in order to measure the alkalinity accurately in terms of pH since, in non-aqueous solutions, measurement of the pH with conventional instruments is erratic and meaningless due to a lack of hydrogen ions.

In order further to illustrate our invention, but without being limited thereto, the following example is given:

Example 120 parts by weight of propionaldehyde are dissolved in 480 parts by weight of propyl alcohol and sufficient alkali such as sodium hydroxide, added thereto so that when a portion of the reaction mixture obtained is diluted with an equal volume of water, the pH of the diluted sample is found to be 8.0. 25 parts by weight of Raney nickel are then added to the reaction mixture and the latter then reacted for 4 hours at a temperature of 250° F. under a hydrogen pressure of 800 pounds per square inch. The propionaldehyde is condensed to propionaldol under these conditions and concurrently hydrogenated to 2-methyl-1,3-pentanediol. The nickel catalyst is filtered from the reaction mixture and the latter then fractionated to separate the 2-methyl-1,3-pentanediol formed. A yield of 60% of theory of 2-methyl-1,3-pentanediol is obtained.

It is to be understood that the foregoing detailed description is given merely by way of illustration and that many variations may be made therein without departing from the spirit of our invention.

Having described our invention, what we desire to secure by Letters Patent is:

1. Process for the production of 2-methyl-1,3-pentanediol, which comprises aldoling under hydrogen pressure an alkaline solution of propionaldehyde in propyl alcohol containing a nickel hydrogenation catalyst at a temperature of 200 to 300° F. for 1 to 4 hours, whereby propionaldol is formed and is concurrently catalytically hydrogenated to 2-methyl-1,3-pentanediol as formed.

2. Process for the production of 2-methyl-1,3-pentanediol, which comprises aldoling under a hydrogen pressure of 200 to 3000 pounds per square inch an alkaline solution of propionaldehyde in propyl alcohol containing a nickel hydrogenation catalyst at a temperature of 200 to 300° F. for 1 to 4 hours, whereby propionaldol is formed and is concurrently catalytically hydrogenated to 2-methyl-1,3-pentanediol as formed.

ALEXANDER F. MacLEAN.
ADIN LEE STAUTZENBERGER.

REFERENCES CITED

The following references are of record in the file of this patent:

UNITED STATES PATENTS

| Number | Name | Date |
|---|---|---|
| 1,907,855 | Mueller-Cunradi et al. | May 9, 1933 |
| 2,112,319 | Wickert | Mar. 29, 1938 |

FOREIGN PATENTS

| Number | Country | Date |
|---|---|---|
| 309,200 | Great Britain | Mar. 28, 1929 |

OTHER REFERENCES

Helvetica Chimica Acta, vol. 12, pages 604–609 (1929) (Montmollin and Martenet).